United States Patent
Kitahara et al.

(10) Patent No.: US 11,283,338 B2
(45) Date of Patent: Mar. 22, 2022

(54) ACTUATOR

(71) Applicant: NIDEC SANKYO CORPORATION, Nagano (JP)

(72) Inventors: Hiroshi Kitahara, Nagano (JP); Tadashi Takeda, Nagano (JP); Masao Tsuchihashi, Nagano (JP)

(73) Assignee: NIDEC SANKYO CORPORATION, Tokyo (JP)

( * ) Notice: Subject to any disclaimer, the term of this patent is extended or adjusted under 35 U.S.C. 154(b) by 402 days.

(21) Appl. No.: 16/499,312

(22) PCT Filed: Mar. 23, 2018

(86) PCT No.: PCT/JP2018/011585
§ 371 (c)(1),
(2) Date: Sep. 29, 2019

(87) PCT Pub. No.: WO2018/180946
PCT Pub. Date: Oct. 4, 2018

(65) Prior Publication Data
US 2021/0104943 A1     Apr. 8, 2021

(30) Foreign Application Priority Data
Mar. 30, 2017 (JP) .............................. JP2017-068656

(51) Int. Cl.
*H02K 33/12* (2006.01)
*H02K 33/18* (2006.01)
*B06B 1/04* (2006.01)

(52) U.S. Cl.
CPC ............. *H02K 33/12* (2013.01); *H02K 33/18* (2013.01); *B06B 1/045* (2013.01)

(58) Field of Classification Search
CPC ........ H02K 33/18; H02K 33/12; H02K 33/16; H02K 1/34; B06B 1/045
See application file for complete search history.

(56) References Cited

U.S. PATENT DOCUMENTS

| 6,105,943 A | 8/2000 | Nagasawa |
| 2005/0063258 A1 | 3/2005 | Pae et al. |

(Continued)

FOREIGN PATENT DOCUMENTS

| CN | 1674429 | 9/2005 |
| CN | 1751809 | 3/2006 |

(Continued)

OTHER PUBLICATIONS

"International Search Report (Form PCT/ISA/210) of PCT/JP2018/011585," dated May 22, 2018, with English translation thereof, pp. 1-4.

(Continued)

*Primary Examiner* — Tulsidas C Patel
*Assistant Examiner* — Robert E Mates
(74) *Attorney, Agent, or Firm* — JCIPRNET

(57) ABSTRACT

Each of holders which holds a coil or a magnet used in a magnetic drive circuit, in a stacked manner in a first direction without causing rattling in an actuator (1), a first coil holder (65) of a first magnetic drive circuit (6), a second coil holder (75) of a second magnetic drive circuit (7), and a third coil holder (85) of a third magnetic drive circuit (8) are arranged in a stacked manner in a Z direction, and the first coil holder, the second coil holder, and the third coil holder are fastened in the Z direction by a restraining member (90). Thus, the first coil holder, the second coil holder, and the third coil holder can be arranged in a stacked manner in the Z direction without causing rattling. The restraining member is constituted by a first member (91) and a second member (92) having the same configuration, including size and shape.

7 Claims, 10 Drawing Sheets

(56) References Cited

U.S. PATENT DOCUMENTS

| | | | | |
|---|---|---|---|---|
| 2011/0101797 A1* | 5/2011 | Lee | ..................... | H02K 33/16 |
| | | | | 310/29 |
| 2011/0266892 A1* | 11/2011 | Wauke | ................... | B06B 1/045 |
| | | | | 310/25 |
| 2015/0091393 A1 | 4/2015 | Hayner et al. | | |

FOREIGN PATENT DOCUMENTS

| | | |
|---|---|---|
| CN | 204810113 | 11/2015 |
| CN | 205490070 | 8/2016 |
| JP | H03296112 | 12/1991 |
| JP | 2011250637 | 12/2011 |
| JP | 2013243883 | 12/2013 |
| JP | 2015226388 | 12/2015 |
| JP | 2016127789 | 7/2016 |
| WO | 2016084809 | 6/2016 |
| WO | 2016167297 | 10/2016 |

OTHER PUBLICATIONS

"Office Action of China Counterpart Application", dated Nov. 3, 2020, with English translation thereof, p. 1-p. 10.

\* cited by examiner

ACTUATOR

CROSS-REFERENCE TO RELATED APPLICATION

This application is a 371 application of the International PCT application serial no. PCT/JP2018/011585, filed on Mar. 23, 2018, which claims the priority benefits of Japan Patent Application No. 2017-068656, filed on Mar. 30, 2017. The entirety of each of the above-mentioned patent applications is hereby incorporated by reference herein and made a part of this specification.

TECHNICAL FIELD

The present invention relates to an actuator for generating various vibrations.

BACKGROUND ART

As an apparatus for generating vibration by a magnetic drive circuit, there has been proposed an actuator having a support provided with a magnet, a movable body having a coil opposed to the magnet in a first direction, and an elastic member disposed between the movable body and the support (refer to Patent Literature 1). Further, in the actuator described in Patent Literature 1, in the case of a holder having the plate thickness direction oriented in the first direction, while two first coils are provided at positions separated in a second direction orthogonal to the first direction, two second coils are provided at positions separated in a third direction orthogonal to the first direction and the second direction. In addition, in the support, a first magnet is disposed on both sides of the first coil in the first direction, and a second magnet is disposed on both sides of the second coil in the first direction. Therefore, the first coil and the first magnet constitute a first magnetic drive circuit that vibrates the movable body in the second direction, and the second coil and the second magnet constitute a second magnetic drive circuit that vibrates the movable body in the third direction. Accordingly, the actuator generates vibration in the second direction and vibration in the third direction.

CITATION LIST

Patent Literature

[Patent Literature 1] Japanese Unexamined Patent Publication No. 2016-127789

SUMMARY OF THE INVENTION

Problems to be Solved by the Invention

According to the actuator described in Patent Literature 1, in the movable body, since the first coil and the second coil are provided planarly with respect to the holder whose plate thickness direction is oriented in the first direction, the planar area of the movable body is large. In order to solve such a problem, the first magnetic drive circuit and the second magnetic drive circuit may be disposed so as to overlap in the first direction. In that case, a first holder for holding the coil or the magnet of the first magnetic drive circuit is disposed to overlap a second holder for holding the coil or the magnet of the second magnetic drive circuit in the first direction. As a result, rattling occurs in the holders due to the influence of the component tolerance or the like.

In view of the above problems, it is an object of the present invention to provide an actuator capable of arranging a plurality of holders for holding a coil or a magnet used in a magnetic drive circuit in a stacked manner in a first direction without rattling.

Means for Solving the Problem

In order to solve the above problem, the actuator according to the present invention includes a support including a first holder and a second holder which overlaps with the first holder in a first direction, a movable body capable of moving with respect to the support, a first magnetic drive circuit including a first coil and a first magnet, one of the first coil and the first magnet held by the first holder, the other held by the movable body, the first magnetic drive circuit driving the movable body in a second direction orthogonal to the first direction, a second magnetic drive circuit including a second coil and a second magnet, one of the second coil and the second magnet held by the holder, the other held by the movable body, the second magnetic drive circuit driving the movable body in a third direction crossing the second direction, and a restraining member which fastens and restrains the first holder and the second holder from both sides in the first direction. The restraining member includes a first portion overlapping with the first holder directly or through another member from one side in the first direction, a second portion that overlaps with the second holder directly or through another member from the other side in the first direction, a third portion connected to the first portion and the second portion on one side of the support in the second direction, a fourth portion connected to the first portion and the second portion on the other side of the support in the second direction, a fifth portion connected to the first portion and the second portion on one side of the support in the third direction, and a sixth portion connected to the first portion and the second portion on the other side of the support in the third direction.

In the actuator according to the present invention, the plurality of holders (the first holder and the second holder) which hold coils or a magnet of the magnetic drive circuits are arranged in a stacked manner in the first direction in the support. For this reason, the plurality of magnetic drive circuits (the first magnetic drive circuit and the second magnetic drive circuit) are arranged to overlap in the first direction. Therefore, the size (planar area) of the actuator when viewed from the first direction is small. Further, although the plurality of holders is arranged to overlap each other in the first direction, the restraining member clamps and restrains the plurality of holders from both sides in the first direction. Therefore, it is possible to arrange the plurality of holders in the first direction without rattling.

The present invention can adopt an aspect in which the restraining member includes a first member in which the third portion and the fourth portion are bent toward the other side in the first direction from one side end and the other end of the first portion in the second direction, a second member in which the fifth portion and the sixth portion are bent toward one side in the first direction from one side end of the second portion in the third direction and the other end of the second portion in the second direction, each of the ends of the third portion and the fourth portion on the other side in the first direction is coupled to the second portion, and each of the ends of the fifth portion and sixth portion on the one side in the first direction is coupled to the first portion.

The present invention can adopt an aspect in which the first member and the second member each is a metal plate member, each of the other ends of the third portion and the fourth portion on the other side of the first direction is coupled to the second portion by welding, and each of the one side ends of the fifth portion and the sixth portion on the one side of the first direction is coupled to the first portion.

The present invention can adopt an aspect in which the first member and the second member are configured to have the same configuration including size and shape. According to the aspect, a common restraining member can be used for the first member and the second member. Therefore, the cost of the actuator can be reduced.

The present invention can adopt an aspect in which the first holder includes a first holding portion which holds the first coil or the first magnet, and a plurality of first columnar portions projecting in the first direction at an end of the first holding portion, the second holder includes a second holding portion which holds the second coil or the second magnet, and a plurality of second columnar portions projecting in the first direction at an end of the second holding portion, and each of the plurality of first columnar portions and the plurality of second columnar portions are coupled to each other.

The present invention can adopt an aspect in which the actuator further includes a third holder provided in the support and arranged to overlap the second holder on the opposite side to the first holder, and a third magnetic drive circuit in which one of the third coil and the third magnet is held by the third holder and the other is held by the movable body to drive the movable body in the second direction, and the restraining member clamps and restrains the first holder, the second holder, and the third holder from both sides of the first direction.

The present invention can adopt an aspect in which the first holder is a first coil holder which holds the first coil, and the second holder is a second coil holder which holds the second coil.

MODE FOR CARRYING OUT THE INVENTION

Embodiments of the present invention will be described with reference to the drawings. In the following description, three directions crossing each other will be described as an X direction, a Y direction, and a Z direction. The Z direction is a direction orthogonal to the X direction and the Y direction. Further, a description will be given in which X1 is given to one side in the X direction, X2 is given to the other side in the X direction, Y1 is given to one side in the Y direction, Y2 is given to the other side in the Y direction, Z1 is given to the one side in the Z direction, and Z2 is given to the other side in the Z direction. Here, the X direction, the Y direction and the Z direction each have the following relationship with the direction in the present invention.

X direction="second direction" in the present invention.
Y direction="third direction" in the present invention.
Z direction="first direction" in the present invention.

(Overall Configuration)

Figure 1:
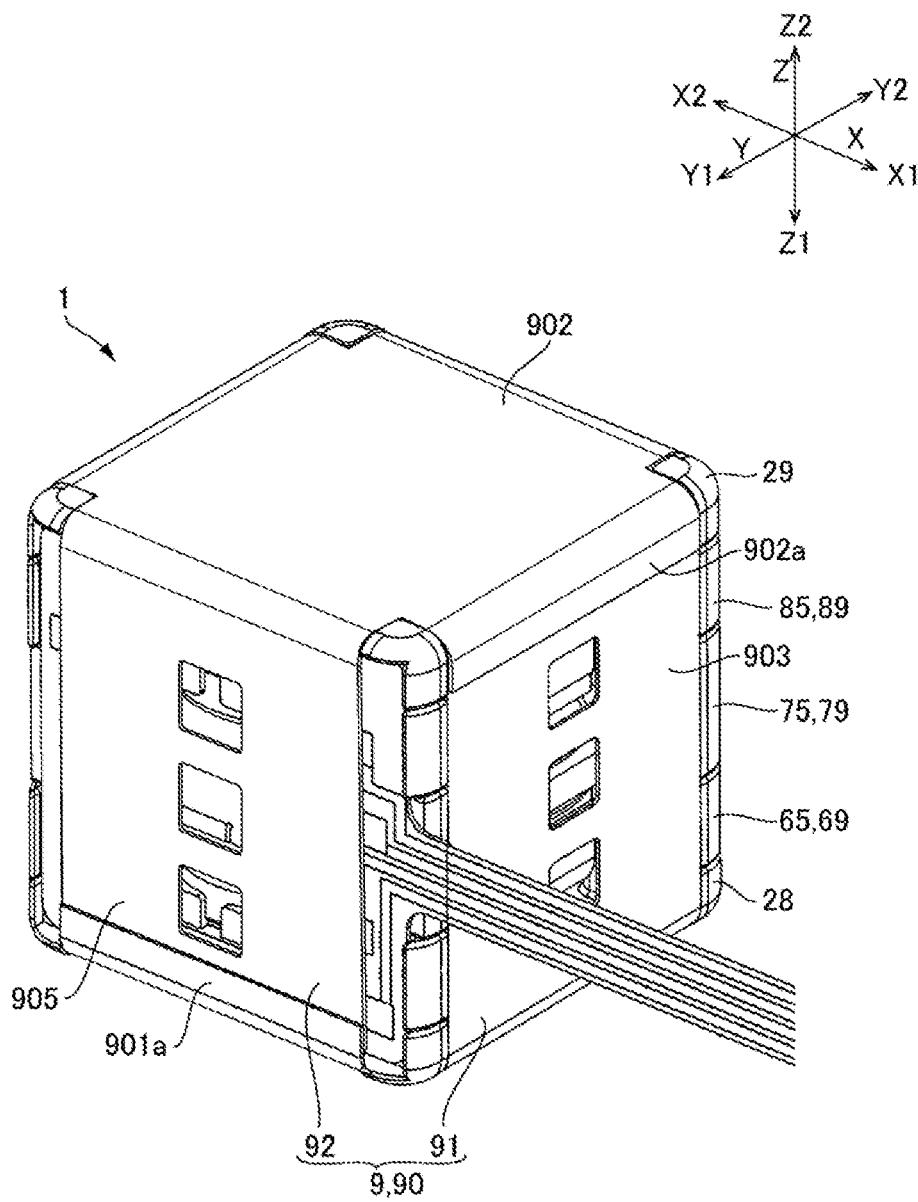
FIG. 1 is a perspective view of an actuator according to a first embodiment of the present invention.
Figure 2:
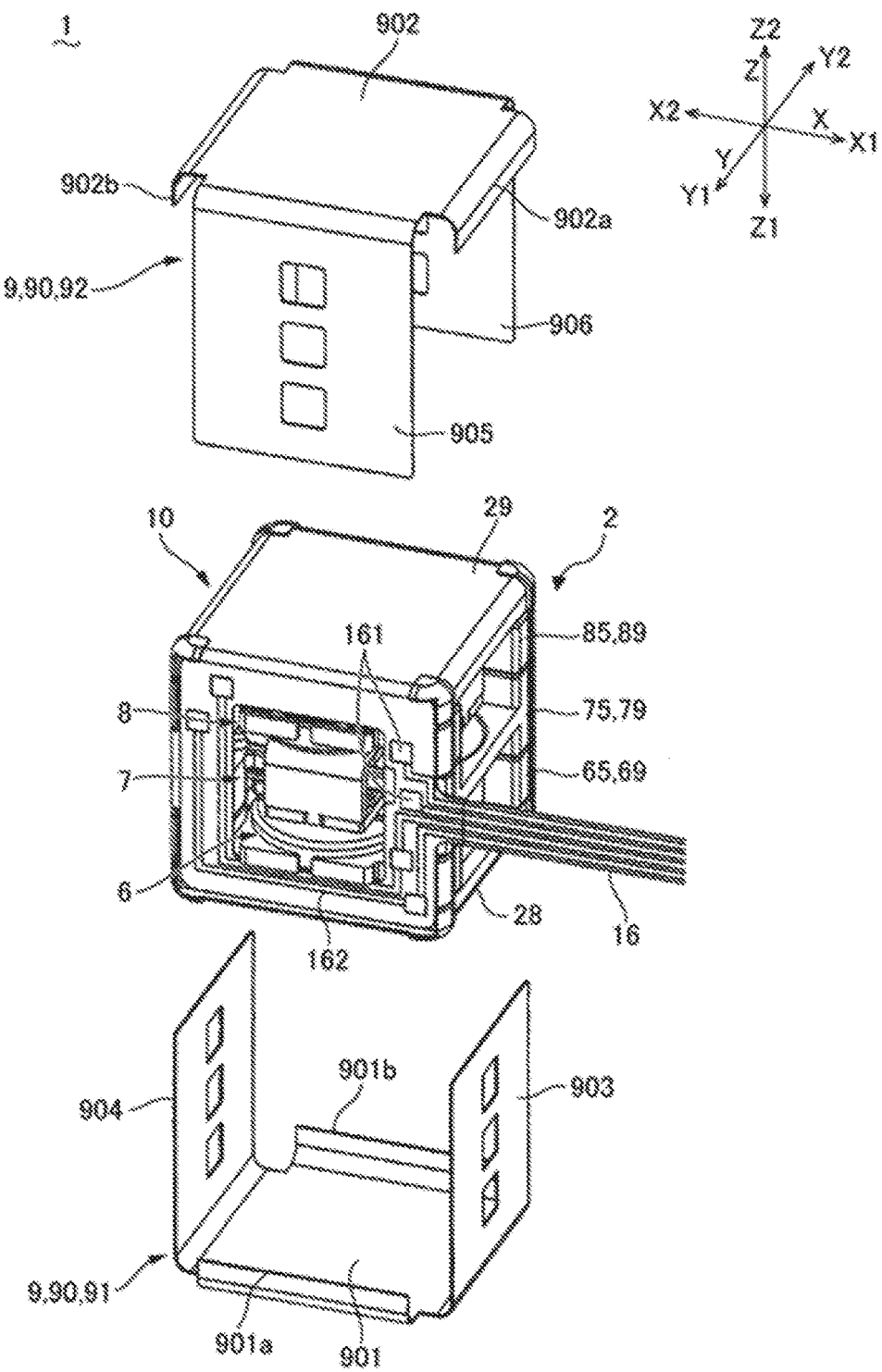
FIG. 2 is an exploded perspective view of the actuator in a state in which a cover shown in FIG. 1 is removed.
Figure 3:
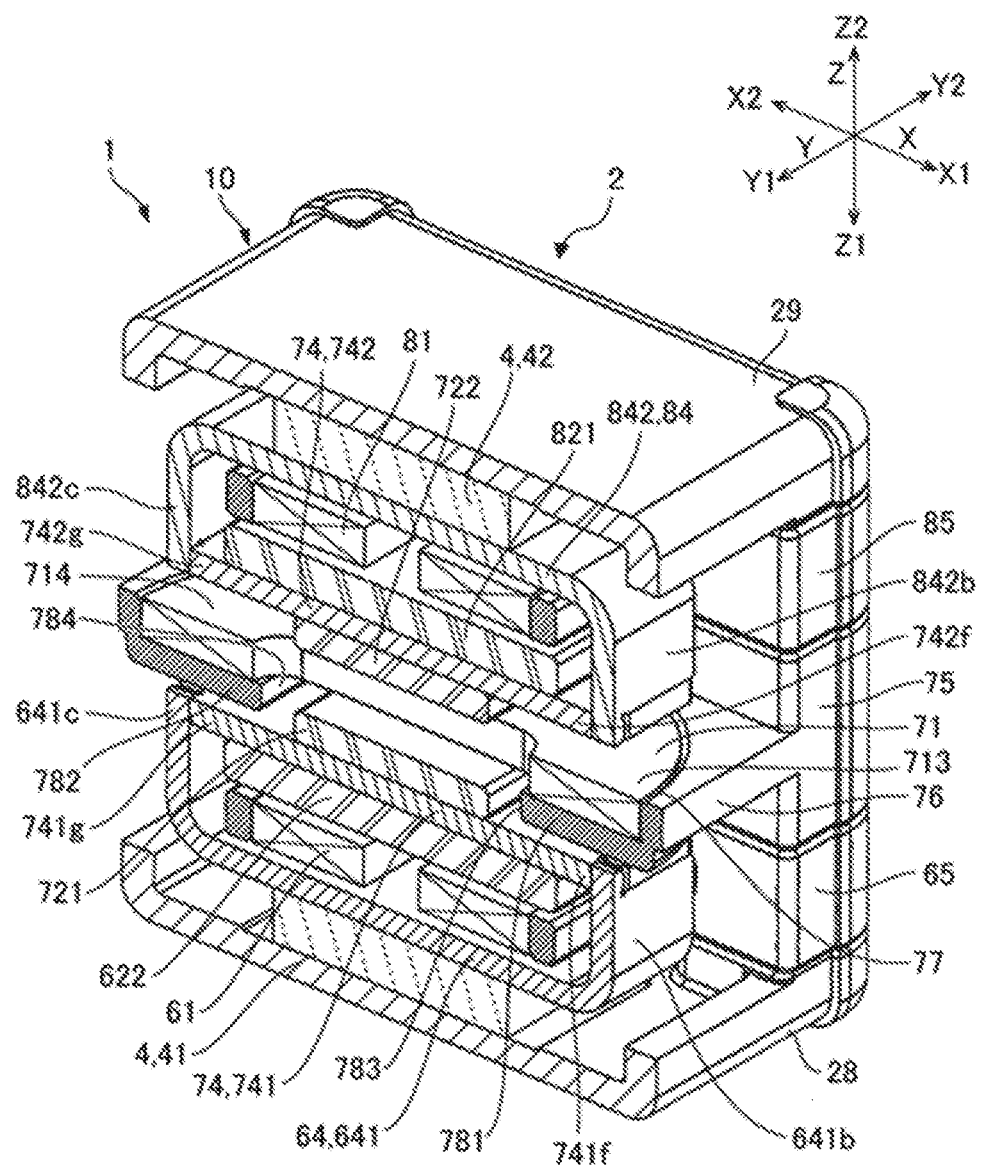
FIG. 3 is an explanatory diagram when the actuator shown in FIG. 1 is cut in a first direction and a second direction.
Figure 4:
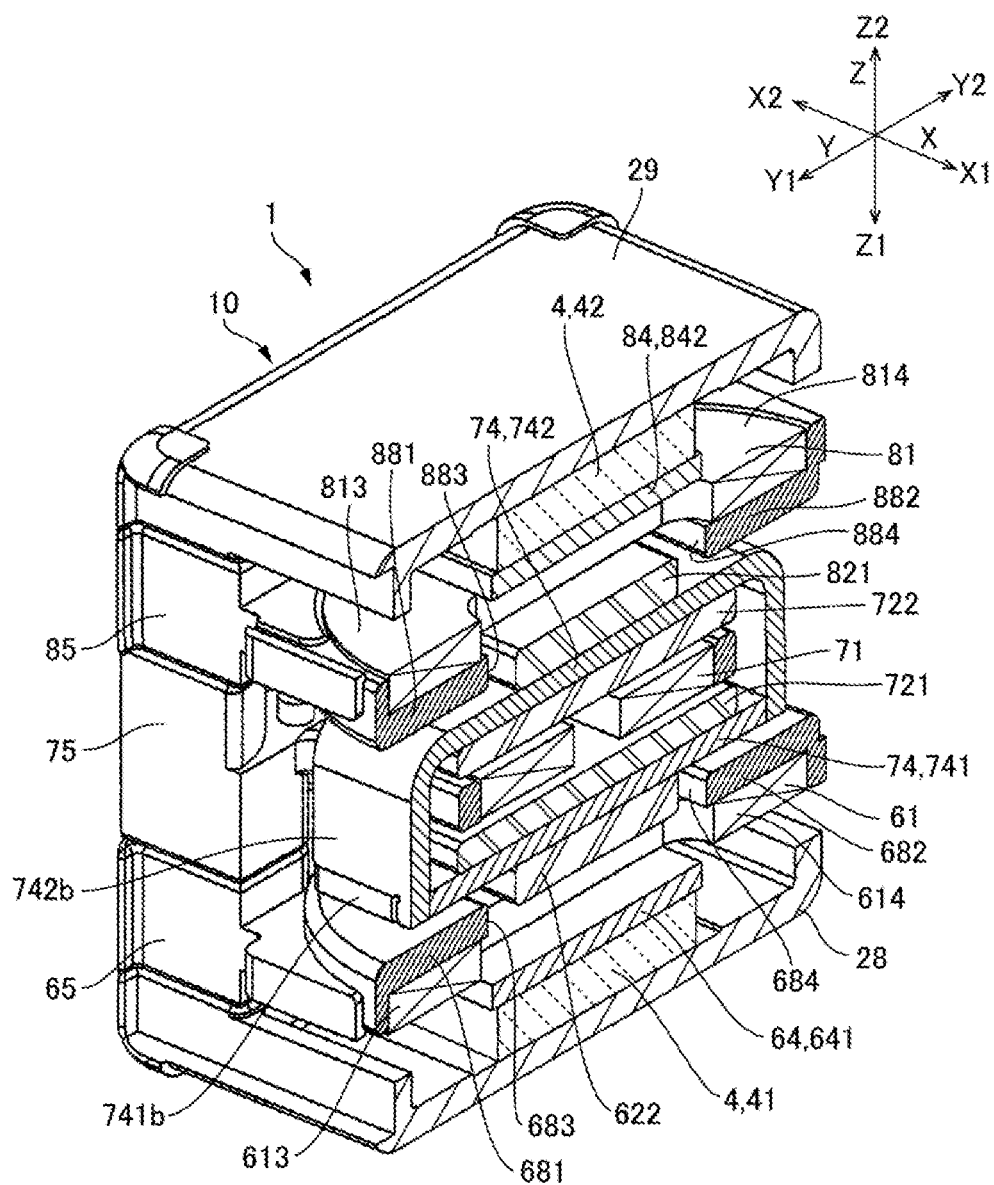
FIG. 4 is an explanatory diagram when the actuator shown in FIG. 1 is cut in the first direction and a third direction.
Figure 5:
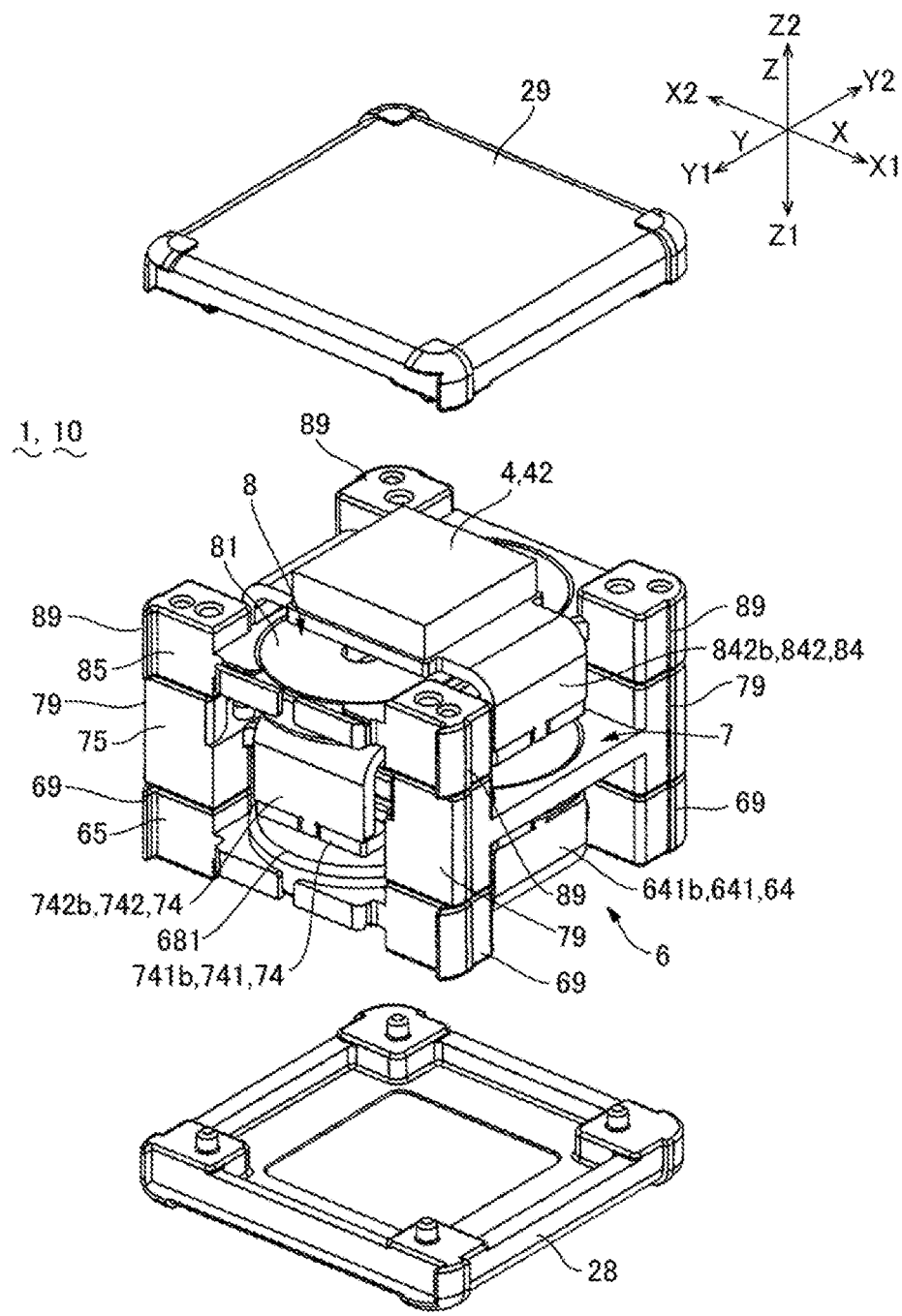
FIG. 5 is an exploded perspective view of the actuator in a state in which a first end plate and a second end plate shown in FIG. 1 are removed.

FIG. 1 is a perspective view of an actuator 1 to which the present invention is applied. FIG. 2 is an exploded perspective view showing a state in which a restraining member is removed from the actuator shown in FIG. 1. FIG. 3 is an explanatory diagram when the actuator 1 shown in FIG. 1 is cut in the first direction (Z direction) and the second direction (X direction). FIG. 4 is an explanatory diagram when the actuator 1 shown in FIG. 1 is cut in the first direction (Z direction) and the third direction (Y direction). FIG. 5 is an exploded perspective view of the actuator 1 in a state in which a first end plate 28 and a second end plate 29 shown in FIG. 1 are removed.

As shown in FIG. 1, the actuator 1 of the present embodiment has a body portion 10 having a rectangular parallelepiped shape and a cover 9 covering the body portion 10. A wiring board 16 such as a flexible wiring board is attached to a surface of the body portion 10 on one side Y1 in the Y direction. A plurality of electrodes 161 and a wiring pattern 162 are formed on the wiring board 16, and an end of a coil to be described later is connected to the electrodes 161.

As shown in FIGS. 3, 4 and 5, the actuator 1 includes a support 2, a movable body 3, and an elastic member 4 disposed between the movable body 3 and the support 2, and the movable body 3 is supported by the support 2 through the elastic member 4 to be movable in the Z direction, the X direction and the Y direction. Further, the actuator 1 has a plurality of magnetic drive circuits (first magnetic drive circuit 6, second magnetic drive circuit 7, and third magnetic drive circuit 8) for driving and vibrating the movable body 3 in the X direction and the Y direction with respect to the support 2.

The support 2 has a first end plate 28 at an end on one side Z1 in the Z direction and a second end plate 29 at an end on the other side Z2 in the Z direction. The first end plate 28 is opposed to the movable body 3 on the one side Z1 in the Z direction, and a first elastic member 41 (elastic member 4) is disposed between the movable body 3 and the first end plate 28. The second end plate 29 is opposed to the movable body 3 on the other side Z2 in the Z direction, and a second elastic member 42 (the elastic member 4) is disposed between the movable body 3 and the second end plate 29.

In the present embodiment, the elastic member 4 is a viscoelastic body having viscoelasticity, and, in the present embodiment, a plate-like gel damper member is used as the elastic member 4 (the viscoelastic body). Both surfaces of the first elastic member 41 in the Z direction are respectively connected to the movable body 3 and the first end plate 28 by a method such as adhesion. Both surfaces of the second elastic member 42 in the Z direction are respectively connected to the movable body 3 and the second end plate 29 by a method such as adhesion. That is, the elastic member 4 is provided on the one side Z1 in the first direction Z with respect to the movable body 3 and on the other side Z2 in the first direction Z with respect to the movable body 3. Also, the elastic member 4 is disposed as a first elastic member 41 in contact with both of the movable body 3 and a portion of the support 2 (the first end plate 28) opposite to the movable body 3 on the one side Z1 in the first direction Z, and as a second elastic member 42 in contact with both of the movable body 3 and a portion of the support 2 (the second end plate 29) opposite to the movable body 3 on the other side Z2 in the first direction Z.

The gel damper member has linear or non-linear expansion and contraction characteristics depending on the expansion and contraction direction thereof. For example, when the plate-like gel damper member is pressed in the thickness direction (axial direction) to be compressively deformed, the plate-like gel damper member has an expansion and contraction characteristic in which the non-linear component is larger than the linear component. On the other hand, when the plate-like gel damper member is pulled and stretched in the thickness direction (axial direction), the plate-like gel damper member has an expansion and contraction characteristic in which the linear component is larger than the nonlinear component. Also, when the plate-like gel damper member is deformed in a direction (shear direction) intersecting with the thickness direction (axial direction), the plate-like gel damper member has a deformation characteristic in which the linear component is larger than the non-linear component. In the present embodiment, the elastic member 4 (the viscoelastic body) is configured to deform in the shearing direction when the movable body 3 is vibrated in the X direction and the Y direction.

The plurality of magnetic drive circuits (the first magnetic drive circuit 6, the second magnetic drive circuit 7, and the third magnetic drive circuit 8) each has coils and magnets opposite each of the coils. The coils are provided on one of the support 2 and the movable body 3, and the magnets are provided on the other of the support 2 and the movable body 3. Further, one of the coils and the magnets, which are provided on the side of the support 2 is held by a holder provided on the side of the support 2, and the other is held by the movable body 3. In the present embodiment, as described below, the coils (first coil 61, second coil 71, and third coil 81) are provided on the support 2. Therefore, the holder is configured as coil holders (first coil holder 65, second coil holder 75, and third coil holder 85) for holding the coils (the first coil 61, the second coil 71, and the third coil 81). Further, the magnets (first magnet 622, second magnets 721 and 722, and third magnet 821), and yokes (first yoke 64, second yoke 74, and third yoke 84) are provided on the movable body 3. In addition, the first magnetic drive circuit 6, the second magnetic drive circuit 7, and the third magnetic drive circuit 8 are arranged in order from the one side Z1 to the other side Z2 in the Z direction.

(Configuration of Drive Circuit)

Figure 6:
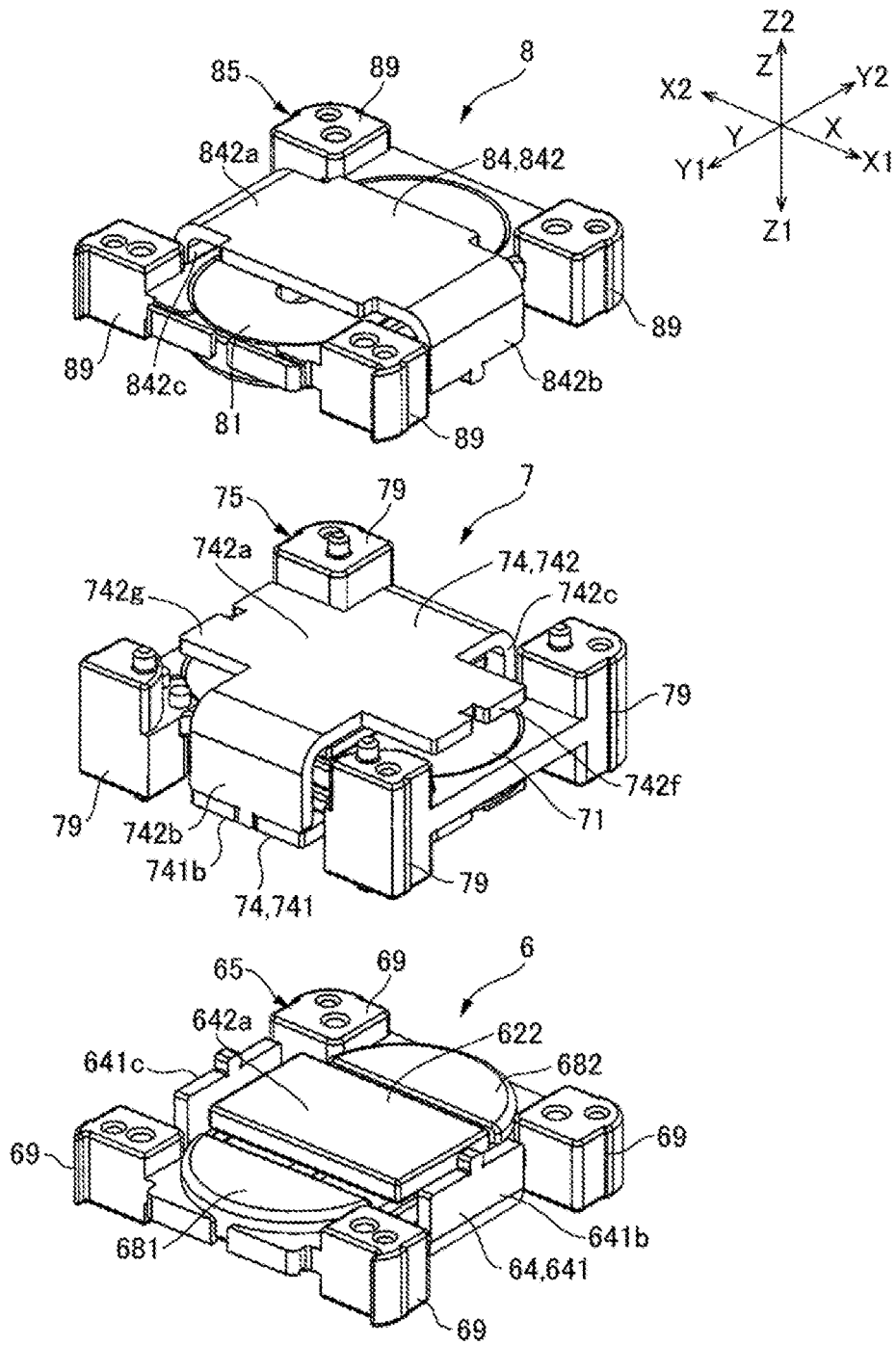
FIG. 6 is an exploded perspective view when a magnetic drive circuit used in the actuator shown in FIG. 1 is disassembled.

FIG. 6 is an exploded perspective view when a magnetic drive circuit used in the actuator shown in FIG. 1 is disassembled. As shown in FIGS. 3, 4, 5 and 6, the first magnetic drive circuit 6 includes the first coil 61, and the first magnet 622 opposed to the first coil 61 on the other side Z2 in the Z direction. The second magnetic drive circuit 7 includes the second coil 71, the second magnet 721 opposed to the second coil 71 on the one side Z1 in the Z direction, and the second magnet 722 opposed to the second coil 71 on the other side Z2 in the Z direction. The third magnetic drive circuit 8 includes the third coil 81, and the third magnet 821 opposed to the third coil 81 on the one side Z1 in the Z direction.

In order to arrange the first magnetic drive circuit 6, the second magnetic drive circuit 7, and the third magnetic drive circuit 8 configured as described above so as to be stacked on one another in the Z direction, the support 2 includes the first coil holder 65 for holding the first coil 61, the second coil holder 75 for holding the second coil 71, and the third coil holder 85 for holding the third coil 81. The first coil holder 65, the second coil holder 75 and the third coil holder 85 are arranged to be stacked sequentially from the one side Z1 to the other side Z2 in the Z direction. Further, among the first coil holder 65, the second coil holder 75, and the third coil holder 85, adjacent coil holders in the Z direction are coupled to each other.

Also, the movable body 3 includes a plurality of yokes (first yoke 64, second yoke 74 and third yoke 84) which are placed on the one side Z1 in the Z direction with respect to the first coil 61, between the first coil 61 and the second coil 71, between the second coil 71 and the third coil 81, and on the other side Z2 in the Z direction with respect to the third coil 81. The first magnet 622, the second magnets 721 and 722, and the third magnet 821 are each held in any one of the plurality of yokes. Further, in the plurality of yokes, adjacent yokes in the Z direction are coupled to each other.

In the present embodiment, a plurality of yokes includes the first yoke 64 (yoke plate 641) disposed on the one side Z1 in the Z direction with respect to the first coil 61, second yokes 74 (yoke plates 741 and 742) disposed on both sides in the Z direction with respect to the second coil 71, and the third yoke 84 disposed on the other side Z2 in the Z direction with respect to the third coil 81. Here, the second yoke 74 holds the second magnets 721 and 722 disposed on both sides in the Z direction with respect to the second coil 71. Further, the second yoke 74 holds the first magnet 622 facing the first coil 61 on the other side Z2 in the Z direction, and the third magnet 821 facing the third coil 81 on the one side Z1 in the Z direction. Therefore, the first yoke 64 and the third yoke 84 do not hold the magnets.

(Detailed Configuration of First Magnetic Drive Circuit 6)

Figure 7:
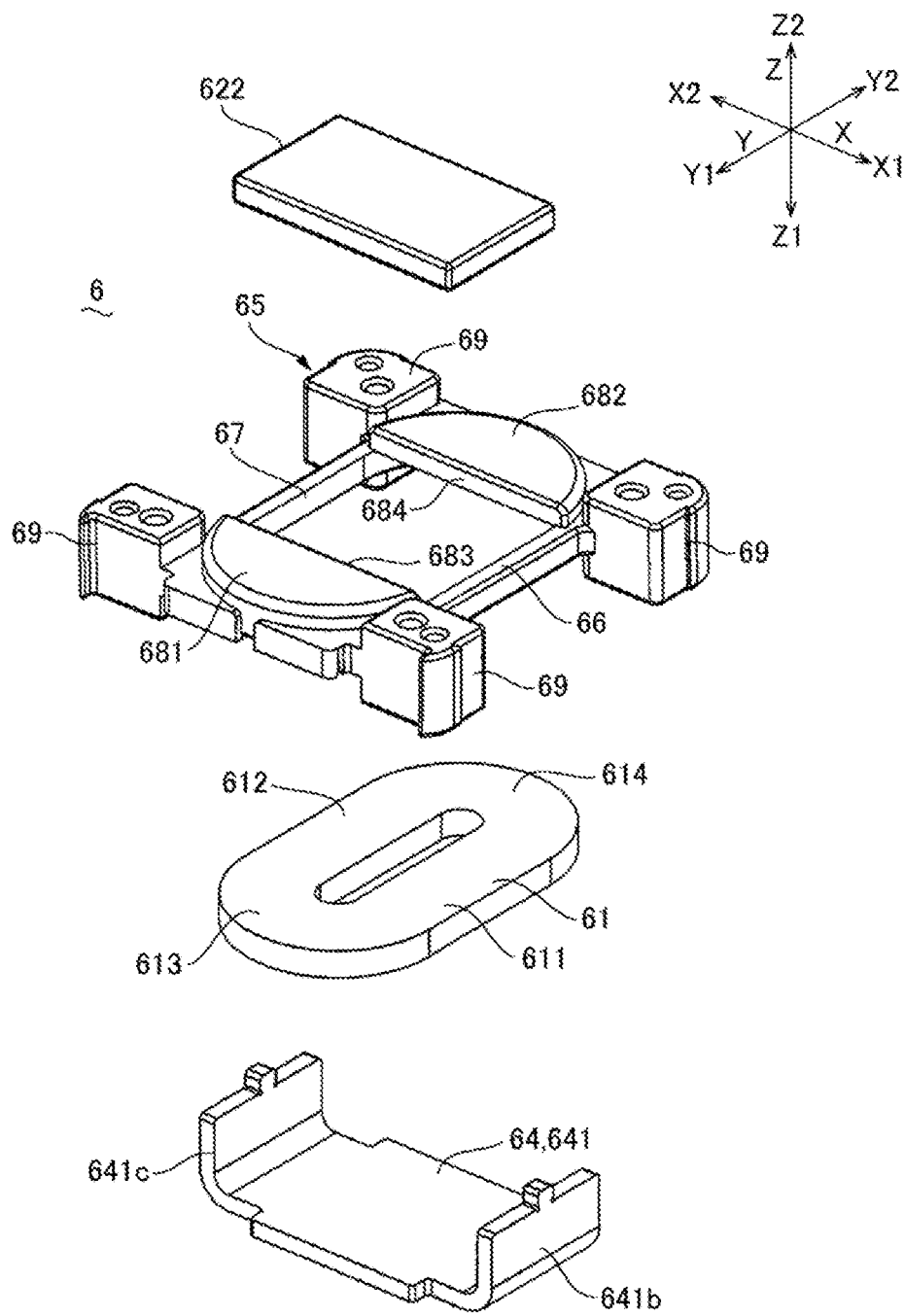
FIG. 7 is an exploded perspective view of a first magnetic drive circuit shown in FIG. 6.

FIG. 7 is an exploded perspective view of the first magnetic drive circuit 6 shown in FIG. 6. As shown in FIGS. 5, 6 and 7, the first coil holder 65 includes a first frame portion 66 (first coil holding portion) which holds the first coil 61 in the inside thereof, and a plurality of first columnar portions 69 projecting from ends (four corners) of the first frame portion 66 toward both sides in the Z direction. The first columnar portion 69 is coupled to the first end plate 28. The first coil holder 65 is made of resin or metal. In the present embodiment, the first coil holder 65 and the first end plate 28 are made of resin, and the first columnar portion 69 and the first end plate 28 are coupled to each other by adhesion or the like.

The first coil 61 used in the first magnetic drive circuit 6 is an oval air-core coil having first effective side portions 611 and 612 (long side portions) extending in the Y direction. In correspondence to the shape, the first frame portion 66 of the first coil holder 65 includes a first opening 67 which has an oval shape and the major axis direction of which is directed in the Y direction, and the first coil 61 is fixed to the inside of the first opening 67 by adhesion or the like.

In the first coil holder 65, on the other side Z2 in the Z direction with respect to the first frame portion 66, first seat portions 681 and 682 are provided to support first invalid side portions 613 and 614 (short sides) extending in the Y direction at both ends of the first coil 61 on the other side Z2 in the Z direction, at positions overlapping with both ends in the Y direction of the first opening 67. The first seat portions 681 and 682 project from the first frame portion 66 to the other side Z2 in the Z direction, and constitute a bottom portion of the other side Z2 in the Z direction at both ends of the first opening 67 in the X direction. Note that a recess (not shown) extends from the first opening 67 to the edge on the one side Z1 of the first frame portion 66 in the Z direction, and the recess is a guide portion for passing the lead-out portion of the winding start of the first coil 61. The thickness (dimension in the Z direction) of the first frame portion 66 is larger than the thickness (dimension in the Z direction) of the first coil 61. Therefore, in a state where the first coil 61 is accommodated inside the first opening 67, the first coil 61 does not project from the first frame portion 66 to the one side Z1 in the Z direction.

The first magnet 622 has a rectangular planar shape, long sides extending in the X direction, and short sides extending in the Y direction. The first magnet 622 is magnetized in the X direction, and the N pole and the S pole are respectively opposed to the first effective side portions 611 and 612 of the first coil 61. Therefore, when the first coil 61 is energized, the first magnetic drive circuit 6 generates a driving force for driving the movable body 3 in the X direction. In the first magnetic drive circuit 6, the first yoke 64 includes the yoke plate 641 disposed on the one side Z1 in the Z direction with respect to the first coil 61. The yoke plate 641 includes side plate portions 641b and 641c which are bent toward the other side Z2 in the Z direction from both ends in the X direction, and a recess is formed at the tip ends of the side plate portions 641b and 641c.

(Detailed Configuration of Second Magnetic Drive Circuit 7)

Figure 8:
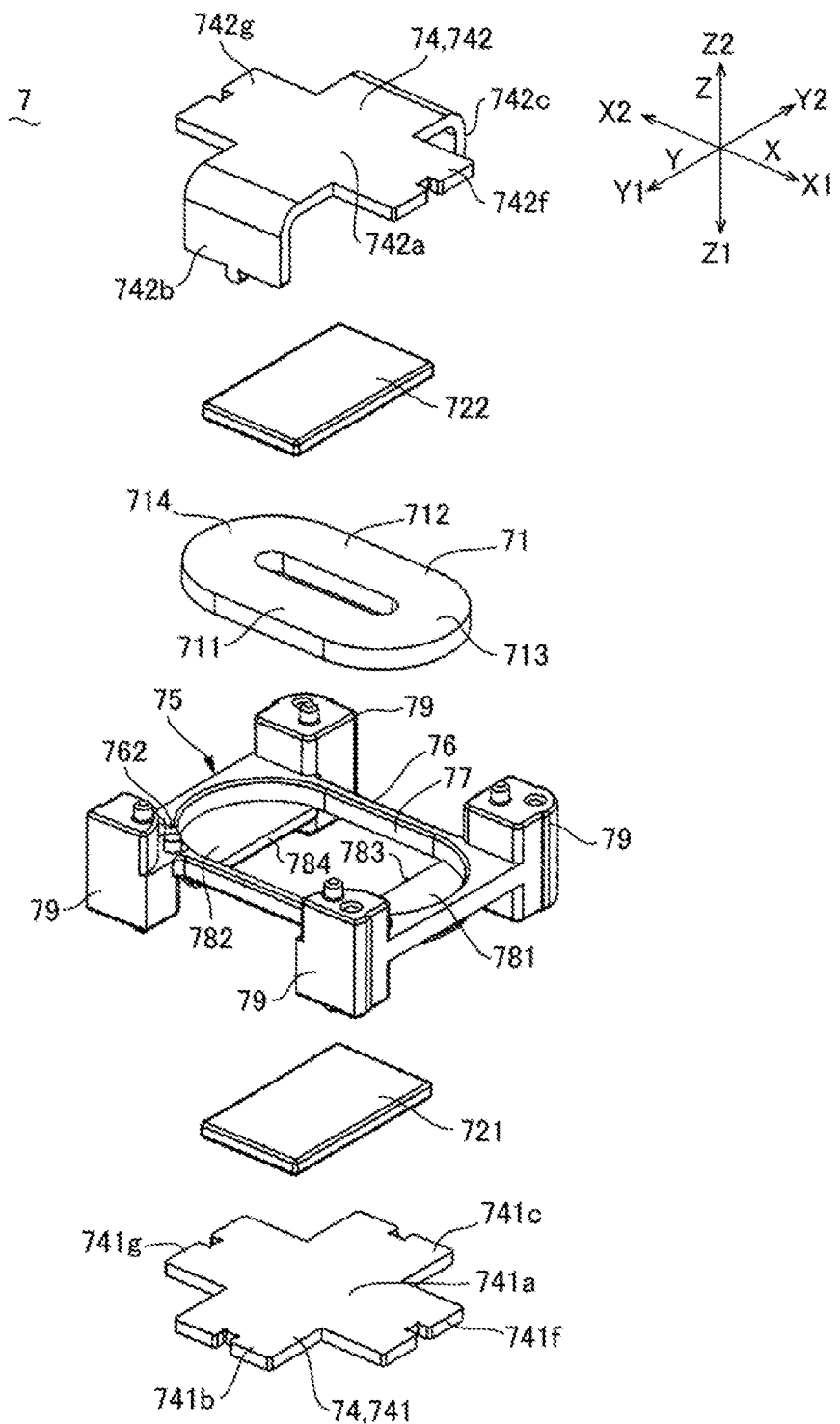
FIG. 8 is an exploded perspective view of a second magnetic drive circuit shown in FIG. 6.

FIG. 8 is an exploded perspective view of the second magnetic drive circuit 7 shown in FIG. 6. As shown in FIGS. 5, 6 and 8, the second coil holder 75 includes a second frame portion 76 (second coil holding portion) for holding the second coil 71 inside, and a plurality of second columnar portions 79 projecting from ends (four corners) of the second frame portion 76 to both sides in the Z direction, and the second columnar portions 79 are coupled with the first columnar portion 69 of the first coil holder 65 adjacent on the one side Z1 in the Z direction. The second coil holder 75 is made of resin or metallic material. In the present embodiment, the second coil holder 75 is made of a resin material, and the first columnar portion 69 and the second columnar portion 79 are coupled to each other by adhesion or the like.

The second coil 71 used in the second magnetic drive circuit 7 is an oval air-core coil having second effective side portions 711 and 712 (long side portions) extending in the X direction. In corresponding to the shape, the second frame portion 76 of the second coil holder 75 includes a second opening 77 which has an oval shape and the major axis direction of which is directed in the X direction and the second coil 71 is fixed to the inside of the second opening 77 by adhesion or the like.

In the second coil holder 75, second seat portions 781 and 782 are provided to support second invalid side portions 713 and 714 (short sides) extending in the Y direction at both ends of the second coil 71 on the one side Z1 in the Z direction, at a position overlapping both ends of the second opening 77 in the X direction, on the one side Z1 in the Z direction with respect to the second frame portion 76. The second seat portions 781 and 782 project from the second frame portion 76 to the one side Z1 in the Z direction, and constitutes a bottom of the one side Z1 in the Z direction at both ends of the second opening 77 in the X direction. A recess 762 extends from the second opening 77 toward the edge of the second frame portion 76, and the recess 762 is a guide portion for passing the lead-out portion of the winding start of the second coil 71. The thickness (dimension in the Z direction) of the second frame portion 76 is larger than the thickness (dimension in the Z direction) of the second coil 71. Therefore, in a state where the second coil 71 is accommodated inside the second opening 77, the second coil 71 does not project from the second frame portion 76 to the other side Z2 in the Z direction.

Each of the second magnets 721 and 722 has a rectangular planar shape, long sides extending in the Y direction, and short sides extending in the Y direction X direction. The second magnets 721 and 722 each is polarized in the Y direction, and the N poles and the S poles are respectively opposed to the second effective side portions 711 and 712 of the second coil 71. Therefore, when the second coil 71 is energized, the second magnetic drive circuit 7 generates a driving force for driving the movable body 3 in the Y direction. In the second magnetic drive circuit 7, the second yoke 74 includes the yoke plate 741 disposed on the one side Z1 in the Z direction with respect to the second coil 71, and the yoke plate 742 disposed on the other side Z2 in the Z direction with respect to the second coil 71. The yoke plate 742 includes a magnet holding portion 742a having a flat shape which holds the second magnet 722 with the surface of the one side Z1 in the Z direction, side plate portions 742b and 742c which are bent toward the one side Z1 in the Z direction from both ends of the magnet holding portion 742a in the Y direction, and coupling plate portions 742f and 742g which project from both ends of the magnet holding portion 742a in the X direction to both sides in the X direction. Convex portions are formed at the tip portions of the side plate portions 742b and 742c, and notches are formed at the tip portions of the coupling plate portions 742f and 742g. In the present embodiment, the third magnet 821 of the third magnetic drive circuit 8 is held on the surface of the magnet holding portion 742a of the yoke plate 742 on the other side Z2 in the Z direction.

The yoke plate 741 includes a magnet holding portion 741a having a flat shape that holds the second magnet 721 with the surface of the other side Z2 in the Z direction, coupling plate portions 741b and 741c protruding from both ends of the magnet holding portion 741a in the Y direction toward the one side Y1 and the other side Y2 in the Y direction, and coupling plate portions 741f and 741g protruding from both ends of the magnet holding portion 741a in the X direction toward the one side Y1 and the other side Y2 in the X direction. Notches are formed in the tip portions of the coupling plate portions 741b, 741c, 741f, and 741g. In the present embodiment, the third magnet 821 of the third magnetic drive circuit 8 is held on the surface of the magnet holding portion 742a of the yoke plate 742 on the other side Z2 in the Z direction.

In the present embodiment, the tip portion of the side plate portion 742b and the tip portion of the coupling plate portion 741b are coupled by welding, crimping, or the like, in a state where the convex portion formed at the tip portion of the side plate portion 742b of the yoke plate 742 is fitted in the notch formed at the tip portion of the coupling plate portion 741b of the yoke plate 741. Also, the tip portion of the side plate portion 742c and the tip portion of the coupling plate portion 741c are coupled by welding, crimping, or the like, in a state where the convex portion formed at the tip portion of the side plate portion 742c of the yoke plate 742 is fitted in the notch formed at the tip portion of the coupling plate portion 741c of the yoke plate 741.

Further, the tip portion of the side plate portion 641b and the tip portion of the coupling plate portion 741f are coupled by welding, crimping, or the like, in a state where the convex portion formed on the tip portion of the side plate portion 641b of the yoke plate 641 shown in FIG. 7 is fitted in the notch formed on the tip portion of the coupling plate portion 741f of the yoke plate 741. Also, the tip portion of the side plate portion 641c and the tip portion of the coupling plate portion 741g are coupled by welding, crimping, or the like, in a state where the convex portion formed on the tip portion of the side plate portion 641c of the yoke plate 641 shown in FIG. 7 is fitted in the notch formed on the tip portion of the coupling plate portion 741g of the yoke plate 741.

(Detailed Configuration of Third Magnetic Drive Circuit 8)

Figure 9:
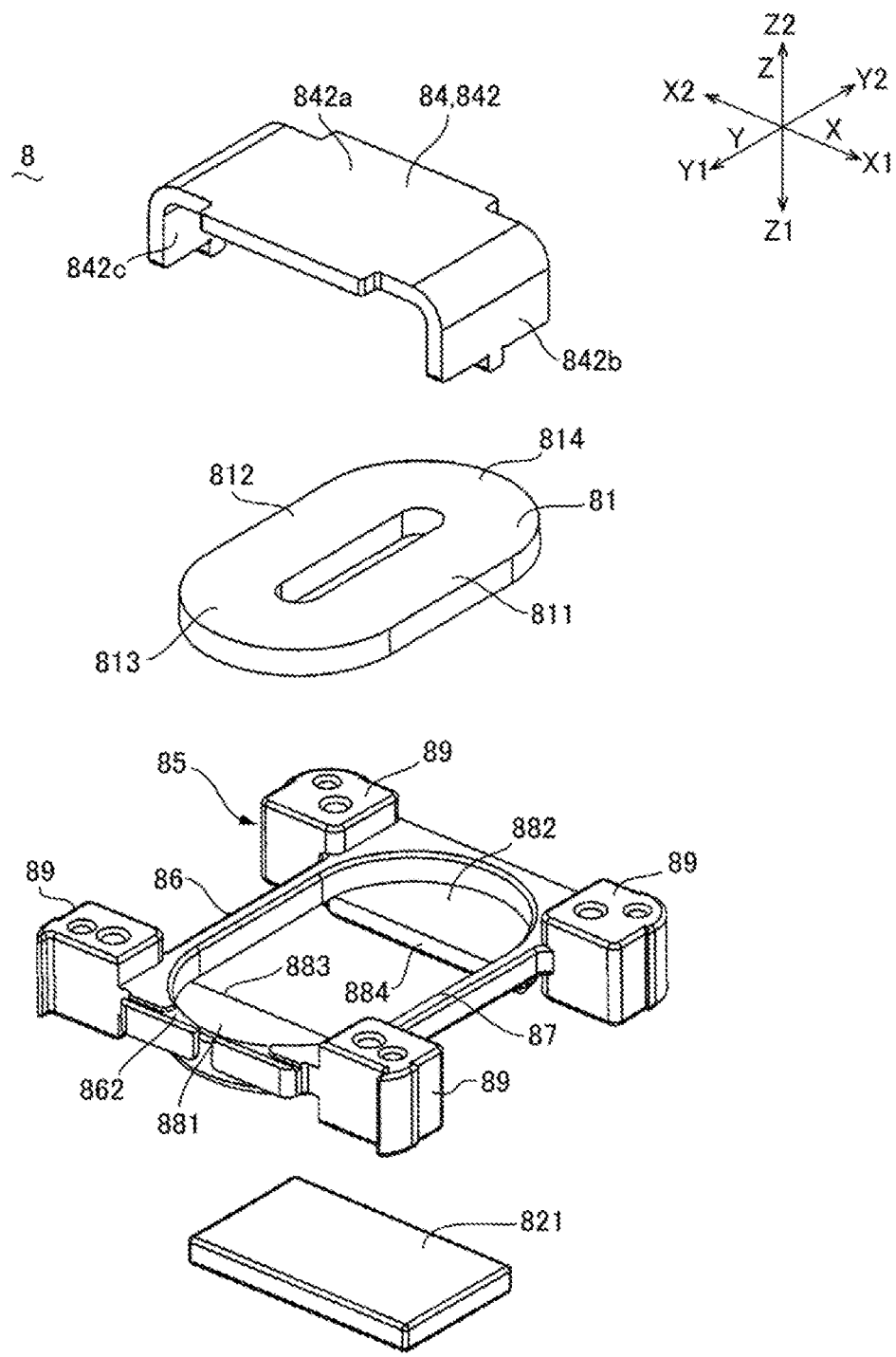
FIG. 9 is an exploded perspective view of a third magnetic drive circuit shown in FIG. 6.

FIG. 9 is an exploded perspective view of the third magnetic drive circuit 8 shown in FIG. 6. As shown in FIGS. 5, 6 and 9, the third coil holder 85 includes a third frame portion 86 (third coil holding portion) that holds the third coil 81 inside and a plurality of third columnar portions 89 projecting from ends (four corners) of the third frame portion 86 to both sides in the Z direction, and the third columnar portion 89 is coupled to the second columnar portion 79 of the second coil holder 75 adjacent on the one side Z1 in the Z direction. In addition, the third columnar portion 89 is coupled to the second end plate 29. The third coil holder 85 is made of a resin or a metal. In the present embodiment, the third coil holder 85 is made of resin, and the second columnar portion 79 and the third columnar portion 89 are coupled to each other by adhesion or the like. Further, the second end plate 29 is made of resin, and the third columnar portion 89 and the second end plate 29 are coupled to each other by adhesion or the like.

The third magnetic drive circuit 8 is configured similarly to the first magnetic drive circuit 6. More specifically, the third coil 81 used in the third magnetic drive circuit 8 is an oval air-core coil having third effective side portions 811 and 812 (long side portions) extending in the Y direction. In corresponding to the shape, the third frame portion 86 of the third coil holder 85 includes a third opening 87 which has an oval shape and the major axis direction of which is directed in the X direction, and the third coil 81 is fixed to the inside of the third opening 87 by adhesion or the like.

In the third coil holder 85, on the one side Z1 in the Z direction with respect to the third frame portion 86, third seat portions 881 and 882 are provided to support third invalid side portions 813 and 814 (short side portions) extending in the X direction at both ends of the third coil 81 with the one side Z1 of the Z direction, at a position overlapping with both ends of the third opening 87 in the Y direction. The third seat portions 881 and 882 project from the third frame portion 86 to the one side Z1 in the Z direction, and constitute the bottom of the one side Z1 in the Z direction at both ends of the third opening 87 in the Y direction. A recess 862 extends from the third opening 87 toward the edge of the third frame portion 86, and the recess 862 is a guide portion for passing the lead-out portion of the winding start of the third coil 81. The thickness (dimension in the Z direction) of the third frame portion 86 is larger than the thickness (dimension in the Z direction) of the third coil 81. Therefore, in a state where the third coil 81 is accommodated inside the third opening 87, the third coil 81 does not project from the third frame portion 86 to the other side Z2 in the Z direction.

The third magnet 821 has a rectangular planar shape, long sides extending in the X direction, and short sides extending in the Y direction. The third magnet 821 is magnetized in the X direction, and the N pole and the S pole are opposed to the third effective side portions 811 and 812 of the third coil 81, respectively. Therefore, when the third coil 81 is energized, the third magnetic drive circuit 8 generates a driving force for driving the movable body 3 in the X direction as well as the first magnetic drive circuit 6. In the present embodiment, the third magnet 821 is magnetized in the same direction as the first magnet 622 of the first magnetic drive circuit 6.

In the third magnetic drive circuit 8, the third yoke 84 includes a yoke plate 842 disposed on the other side Z2 in the Z direction with respect to the third coil 81. The yoke plate 842 has side plate portions 842b and 842c bent from both ends in the X direction toward the one side Z1 in the Z direction, and convex portions are formed at the tip portions of the side plate portions 842b and 842c. In the present embodiment, the tip portion of the side plate portion 842b and the tip portion of the coupling plate portion 742f are coupled by welding, crimping, or the like, in a state where the convex portion formed on the tip portion of the side plate portion 842b of the yoke plate 842 is fitted in the notch formed on the tip portion of the coupling plate portion 742f of the yoke plate 742. Also, the tip portion of the side plate portion 842c and the tip portion of the coupling plate portion 742g are coupled by welding, crimping, or the like, in a state where the convex portion formed on the tip portion of the side plate portion 842c of the yoke plate 842 is fitted in the notch formed on the tip portion of the coupling plate portion 742g of the yoke plate 742.

(Positional Relationship Between Magnetic Center of Magnetic Drive Circuit and Center of Gravity of Movable Body 3)

In the actuator 1 configured as described above, the first coil 61, the second coil 71, the third coil 81, the first coil holder 65, the second coil holder 75, and the third coil holder 85 are configured to be symmetrical with respect to a virtual line extending in the Y direction through the center of the movable body 3 in the X direction, and with respect to a virtual line extending in the X direction through the center of the Y direction. Also, the first magnet 622, the second magnets 721 and 722, the third magnet 821, the first yoke 64, the second yoke 74, and the third yoke 84 are configured to be symmetrical with respect to a virtual line extending in the Y direction through the center of the movable body 3 in the X direction, and with respect to a virtual line extending in the X direction through the center in the Y direction. Further, the second coil 71 is located at the center of the movable body 3 in the Z direction, and the second magnets 721 and 722 are disposed plane-symmetrically about the second coil 71 in the Z direction. Moreover, the first magnet 622 and the first yoke 64 are arranged plane-symmetrically about the second coil 71 in the Z direction with respect to the third magnet 821 and the third yoke 84.

Therefore, the magnetic center position (drive center) of the second magnetic drive circuit 7 coincides with or substantially coincides with the position of the center of gravity of the movable body 3 in the Z, X, and Y directions. Also, the magnetic center position obtained by combining the magnetic center position of the first magnetic drive circuit 6 and the magnetic center position of the third magnetic drive circuit 8 coincides with or substantially coincides with the position of the center of gravity of the movable body 3 in the Z, X and Y directions.

(Configuration of Restraining Member 90)

Referring again to FIGS. 1 and 2, in the support 2, the first coil holder 65, the second coil holder 75, and the third coil holder 85 are arranged to be sequentially stacked from the one side Z1 to the other side Z2 in the Z direction. The outer shape of the support 2 and the body portion 10 is configured by the first end plate 28, the first coil holder 65, the second coil holder 75, the third coil holder 85, and the second end plate 29.

When assembling the actuator 1 configured as described above, the body portion 10 is configured by overlapping the first end plate 28, the first elastic member 41, the first coil holder 65 holding the first yoke 64 and the first coil 61, the second yoke 74 holding the first magnet 622, the second magnets 721 and 722, and the third magnet 821, the second coil holder 75 holding the second coil 71, the third coil holder 85 holding the third coil 81, the third yoke 84, the second elastic member 42, and the second end plate 29, in the Z direction. Next, the cover 9 shown in FIGS. 1 and 2 is attached. At this time, the cover 9 functions as a restraining member 90 for clamping and restraining the first coil holder 65, the second coil holder 75, and the third coil holder 85 from both sides in the Z direction.

In the present embodiment, the restraining member 90 includes a first member 91 that covers the body portion 10 from the one side Z1 in the Z direction, and a second member 92 that covers the body portion 10 from the other side Z2 in the Z direction. In a state where the first member 91 and the second member 92 are coupled, the restraining member 90 (the first portion 91 and the second member 92) clamps the body portion 10 from both sides in the Z direction with a first portion 901 and a second portion 902 overlapping with both sides in the Z direction. In the present embodiment, the first member 91 and the second member 92 are formed of a metal plate member bent to have a predetermined shape.

More specifically, the first member 91 includes the first portion 901 having a plate shape overlapping the first coil holder 65 through the first end plate 28 and the first elastic member 41 from the one side Z1 in the Z direction, a third portion 903 having a plate shape bent from an end of the first portion 901 on one side X1 in the X direction toward the other side Z2 in the Z direction, and a fourth portion 904 having a plate shape bent from an end of the first portion 901 on the other side X2 in the X direction toward the other side Z2 in the Z direction. Note that the first portion 901 includes coupling portions 901*a* and 901*b* bent toward the other side Z2 in the Z direction at the end of the one side Y1 and the end of the other side Y2 in the Y direction.

The second member 92 includes the second portion 902 having a plate shape overlapping the second coil holder 75 and the third coil holder 85 through the second end plate 29 and the second elastic member 42 from the other side Z2 in the Z direction, a fifth portion 905 having a plate shape bent from an end of the second portion 902 on the one side Y1 in the Y direction toward the one side Z1 on the Z direction, and a sixth portion 906 having a plate shape bent from an end of the second portion 902 on the other side Y2 in the Y direction toward the one side Z1 in the Z direction. Note that the second portion 902 includes coupling portions 902*a* and 902*b* bent toward the one side Z1 in the Z direction at the end of the one side X1 and the end of the other side X2 in the X direction.

In the present embodiment, the first member 91 and the second member 92 are made of a metal member having the same configuration including size and shape. Therefore, the first member 91 and the second member 92 are put on the body portion 10 from both sides in the Z direction and pressed from both sides to tighten the first end plate 28, the first coil holder 65, the second coil holder 75, the third coil holder 85, and the second end plate 29, such that there is no gap between the first columnar portion 69, the second columnar portion 79 and the third columnar portion 89. As a result, the tips of the fifth portion 905 and the sixth portion 906 overlap with the tips of the coupling portions 901*a* and 901*b* of the first portion 901, and the tips of the third portion 903 and the fourth portion 904 overlap the tips of the coupling portions 902*a* and 902*b* of the second portion 902. Therefore, the coupling portions 901*a* and 901*b* of the first portion 901 are respectively welded to the fifth portion 905 and the sixth portion 906, and the coupling portions 902*a* and 902*b* of the second portion 902 are respectively welded to the third portion 903 and the fourth portion 904, to be the status shown in FIG. 1. That is, in the restraining member 90, the third portion 903 is connected to the first portion 901 and the second portion 902 of the support 2 on the one side X1 in the X direction, and the fourth portion 904 is connected to the first portion 901 and the second portion 902 of the support 2 on the other side X2 in the X direction. Also, the fifth portion 905 is connected to the first portion 901 and the second portion 902 of the support 2 on the one side Y1 in the Y direction, and the sixth portion 906 is connected to the first portion 901 and the second portion 902 of the support 2 on the other side Y2 in the Y direction.

In this state, the first end plate 28, the first coil holder 65, the second coil holder 75, the third coil holder 85, and the second end plate 29 are exposed from the gap between the first member 91 and the second member 92 at the corner portion. Therefore, since the respective boundary portions of the first end plate 28, the first coil holder 65, the second coil holder 75, the third coil holder 85, and the second end plate 29 can be welded, the first end plate 28, the first coil holder 65, the second coil holder 75, the third coil holder 85, and the second end plate 29 can be coupled to each other without generating an unnecessary gap. It should be noted that, in the present embodiment, the first member 91 and the second member 92 are all made of the same metal member, but the present invention is not limited thereto. The members may have the same configuration including size and shape.

(Basic Operation)

In the actuator 1 of the present embodiment, an alternating current (AC) is applied to the first coil 61 and the third coil 81. On the other hand, the power supply to the second coil 71 is stopped. As a result, the movable body 3 vibrates in the X direction, and the center of gravity in the actuator 1 fluctuates in the X direction. Therefore, the user can feel the vibration in the X direction. At this time, the AC waveforms applied to the first coil 61 and the third coil 81 may be adjusted such that the acceleration that the movable body 3 moves to the one side X1 in the X direction is different from the acceleration that the movable body 3 moves to the other side X2 in the second direction. As a result, the user can feel vibration having directivity in the X direction.

Further, AC is applied to the second coil 71, and the power supply to the first coil 61 and the third coil 81 is stopped. As a result, the movable body 3 vibrates in the Y direction, and the center of gravity in the actuator 1 fluctuates in the Y direction. Therefore, the user can feel the vibration in the Y direction. At this time, the AC waveform applied to the second coil 71 may be adjusted such that the acceleration that the movable body 3 moves to the one side Y1 in the Y direction is different from the acceleration that the movable body 3 moves to the other side Y2 in the third direction. As a result, the user can feel vibration having directivity in the Y direction.

Further, by combining the energization of the first coil 61 and the third coil 81 and the energization of the second coil 71, the user can obtain a sensation that combines the vibration in the X direction and the vibration in the Y direction. Further, when alternating current of opposite phase is applied to the first coil 61 and the third coil 81, couple of forces around a center axis extending in the Z direction is applied to the movable body 3, so that the user can obtain a more complicated feeling.

(Stopper Mechanism)

The actuator 1 of the present embodiment has a stopper mechanism shown in FIGS. 3 and 4 so as to prevent a weak point of one of the support 2 or the movable body 3 from coming into contact to the other when the movable body 3 moves excessively with respect to the support 2. More specifically, as shown in FIG. 4, the first seat portion 681 of the first coil holder 65 is located at a position facing the first magnet 622 with a predetermined distance on the one side Y1 in the Y direction, and the first seat portion 682 of the first coil holder 65 is located at a position facing the first magnet 622 with a predetermined distance on the other side Y2 in the Y direction. Further, the third seat portion 881 of the third coil holder 85 is located at a position facing the third magnet 821 with a predetermined distance on the one side Y1 in the Y direction, and the third seat portion 882 of the third coil holder 85 is located at a position facing the third magnet 821 with a predetermined distance on the other side Y2 in the Y direction. In the present embodiment, the side ends of the first seat portions 681 and 682 opposite to the first magnet 622 in the Y direction function as first stopper portions 683 and 684. Further, the side ends of the third seat portions 881 and 882 opposite to the third magnet 821 in the Y direction function as third stopper portions 883 and 884. Therefore, the movable range of the movable body 3 in the Y direction when the movable body 3 is driven in the Y direction by the second magnetic drive circuit 7 is regulated by a stopper mechanism constituted by the first magnet 622 of the first magnetic drive circuit 6 and the first seat portions 681 and 682 (the first stoppers 683 and 684) of the first coil holder 65, and a stopper mechanism constituted by the third magnet 821 of the third magnetic drive circuit 8 and the third seat portions 881 and 882 (the third stoppers 883 and 884) of the third coil holder 85.

In the present embodiment, the first stopper portions 683 and 684 are positioned closer to the side of the first magnet 622 than the inner edges of the first invalid side portions 613 and 614 of the first coil 61. Therefore, even if, for example, the lead-out portion on the winding start side of the first coil 61 passes between the first coil 61 and the first seat portion 681 from the inner edge of the first invalid side portion 613, it is unlikely that the first magnet 622 will come into contact with the lead-out portion on the winding start side of the first coil 61. Accordingly. it is unlikely that the lead-out portion on the winding start side of the first coil 61 will be disconnected. Also, the third stopper portions 883 and 884 are located closer to the side of the third magnet 821 than the inner edges of the third invalid side portions 813 and 814 of the third coil 81. Therefore, even if, for example, the lead-out portion on the winding start side of the third coil 81 passes between the third coil 81 and the third seat portion 881 from the inner edge of the third invalid side portion 813, it is unlikely that the third magnet 821 will come into contact with the lead-out portion on the winding start side of the third coil 81. Accordingly, it is unlikely that the lead-out portion on the winding start side of the third coil 81 will be disconnected.

Further, as shown in FIG. 3, the second seat portion 781 of the second coil holder 75 is located at a position opposite to the second magnet 721 of the second magnetic drive circuit 7 with a predetermined distance on the one side X1 in the X direction, and the second seat portion 782 of the second coil holder 75 is located at a position opposite to the second magnet 721 with a predetermined distance on the other side X2 in the X direction. In the present embodiment, the side ends of the second seat portions 781 and the second seat portion 782 opposite to the second magnet 721 in the X direction functions as the second stopper portions 783 and 784. Therefore, the movable range when the movable body 3 is driven in the X direction by the first magnetic drive circuit 6 and the third magnetic drive circuit 8 is regulated by a stopper mechanism constituted by the second magnet 721 of the second magnetic drive circuit 7 and the second seat portions 781 and 782 (the second stoppers 783 and 784) of the second coil holder 75.

In the present embodiment, the second stopper portions 783 and 784 are positioned closer to the side of the second magnets 721 than the inner edges of the second invalid side portions 713 and 714 of the second coil 71. Therefore, even if, for example, the lead-out portion on the winding start side of the second coil 71 passes between the second coil 71 and the second seat portion 781 from the inner edge of the second invalid side portion 713, it is unlikely that the second magnet 721 will come into contact with the lead-out portion on the winding start side of the second coil 71. Therefore, it is unlikely that the lead-out portion on the winding start side of the second coil 71 will be disconnected.

(Main Effect of the Present Embodiment)

As described above, since the actuator 1 according to the present embodiment has the first magnetic drive circuit 6 vibrating the movable body 3 in the X direction, the second magnetic drive circuit 7 vibrating the movable body 3 in the Y direction, and the third magnetic drive circuit 8 vibrating the movable body 3 in the X direction, so that the actuator 1 of the present embodiment can vibrate the movable body 3 in the X direction and the Y direction. Therefore, the user can feel vibration in the X direction, vibration in the Y direction, and vibration combined by the vibration in the X direction and the vibration in the Y direction. Moreover, since the first magnetic drive circuit 6, the second magnetic drive circuit 7, and the third magnetic drive circuit 8 is arranged to be stacked in the Z direction, the size (planar area) of the actuator 1 when viewed from the Z direction is small. Therefore, the actuator 1 according to the present embodiment is suitable for mounting on a device such as a controller or the like in hand. Further, the first magnetic drive circuit 6 and the third magnetic drive circuit 8 for vibrating the movable body 3 in the X direction are provided on both sides of the second magnetic drive circuit 7 for vibrating the movable body 3 in the Y direction. Therefore, when the movable body 3 vibrates in the X direction, a situation such as tilting of the movable body 3 hardly occurs. Also, the magnetic center position (drive point) of the second magnetic drive circuit 7 coincides with or substantially coincides with the position of the center of gravity of the movable body 3 in the Z, X and Y directions. Also, the magnetic center position obtained by combining the magnetic center position (drive point) of the first magnetic drive circuit 6 and the magnetic center position (drive point) of the third magnetic drive circuit 8 coincides or substantially coincides with the position of the center of gravity of the movable body 3 in the Z, X, and Y directions. Therefore, when the movable body 3 vibrates in the X direction and the Y direction, a situation such as tilting of the movable body 3 hardly occurs.

Further, in the case where the first magnetic drive circuit 6, the second magnetic drive circuit 7, and the third magnetic drive circuit 8 are arranged to overlap in the Z direction, the first coil holder 65, the second coil holder 75, and the third coil holder 85 are arranged to overlap in the Z direction. At this time, the first coil holder 65, the second coil holder 75, and the third coil holder 85, together with the first end plate 28 and the second end plate 29, are clamped in the Z direction by the restraining member 90. Therefore, the first coil holder 65, the second coil holder 75, and the third coil holder 85 can be overlapped in the Z direction without rattling. The restraining member 90 is formed of the first member 91 and the second member 92 which are all identical in structure to each other including size and shape. Since the cost of the restraining member 90 can be reduced, the cost of the actuator 1 can be reduced.

Further, the first coil holder 65, the second coil holder 75, and the third coil holder 85 are coupled through the first columnar portion 69 of the first coil holder 65, the second columnar portion 79 of the second coil holder 75, and the third columnar portion 89 of the third coil holder 85. Therefore, the first coil holder 65, the second coil holder 75, and the third coil holder 85 can be integrated in a state where a space for arranging a magnet or a yoke is secured between each of the first coil 61, the second coil 71, and the third coil 81. Even in this case, the first coil holder 65, the second coil holder 75, and the third coil holder 85 are tightened in the Z direction by the restraining member 90, so that the first coil holder 65, the second coil holder 75, and the third coil holder 85 can be reinforced.

Also, the elastic member 4 is the viscoelastic member having viscoelasticity, and is provided on the one side Z1 in the Z direction with respect to the movable body 3 and on the other side Z2 in the Z direction with respect to the movable body 3. Therefore, when the movable body 3 vibrates in the X direction and the Y direction with respect to the support 2, the elastic member 4 deforms in the shearing direction orthogonal to the expansion and contraction direction. Therefore, since the elastic member 4 is deformed in a range in which linearity is high, it is possible to obtain a vibration characteristic with good linearity.

That is, the elastic member 4 (the first elastic member 41 and the second elastic member 42) is the viscoelastic member (plate-like gel damper member), and has linear or non-linear expansion and contraction characteristics depending on the expansion and contraction direction. For example, when the elastic member 4 is pressed in the thickness direction (axial direction) to be compressed and deformed, the elastic member 4 has an expansion and contraction characteristic in which the non-linear component (spring coefficient) is larger than the linear component (spring coefficient). On the other hand, when the elastic member 4 is pulled and extended in the thickness direction (axial direction), the elastic member 4 has an expansion and contraction characteristic in which the linear component (spring coefficient) is larger than the non-linear component (spring coefficient). Further, when the elastic member 4 is deformed in a direction (shearing direction) intersecting the thickness direction (axial direction), the deformation is a deformation in a direction in which the elastic member 4 is pulled and extended even if it moves in any direction. Therefore, the elastic member 4 has a deformation characteristic in which the linear component (spring coefficient) is larger than the non-linear component (spring coefficient). In the present embodiment, when the movable body 3 vibrates in the X direction and the Y direction, the elastic member 4 (viscoelastic member) is configured to deform in the shearing direction. Therefore, in the elastic member 4, when the movable body 3 vibrates in the X direction and the Y direction, the spring force in the movement direction becomes constant. Therefore, by using the spring element in the shearing direction of the elastic member 4 to improve the reproducibility of the vibration acceleration to the input signal, it is possible to realize the vibration with delicate nuances.

Further, the elastic member 4 is attached so as to expand and contract in the first direction Z between the movable body 3 and the support 2. Furthermore, when the elastic member 4 is pressed in the thickness direction (axial direction) between the movable body 3 and the support 2 to be compressed and deformed, the elastic member 4 has an expansion and contraction characteristic in which the non-linear component (spring coefficient) is larger than the linear component (spring coefficient). Therefore, it is possible to suppress large deformation of the elastic member 4 in the Z direction orthogonal to the driving direction of the movable body 3. Therefore, a large change in the gap between the movable body 3 and the support 2 can be suppressed.

Also, both surfaces of the first elastic member 41 in the Z direction are respectively connected to the movable body 3 and the first end plate 28 by a method such as adhesion, and both surfaces of the second elastic member 42 in the Z direction are respectively connected to the movable body 3 and the second end plate 29 by a method such as adhesion. Therefore, since the elastic member 4 reliably follows the movement of the movable body 3, it is possible to effectively prevent the resonance of the movable body 3.

Further, the movable range when the movable body 3 is driven in the X direction by the first magnetic drive circuit 6 and the third magnetic drive circuit 8 is regulated by a stopper mechanism constituted by the second magnet 721 of the second magnetic drive circuit 7 and the second seat portions 781 and 782 of the second coil holder 75. Also, the movable range of the movable body 3 in the Y direction when the movable body 3 is driven in the Y direction by the second magnetic drive circuit 7 is regulated by a stopper mechanism constituted by the first magnet 622 of the first magnetic drive circuit 6 and the first seat portions 681 and 682 of the first coil holder 65, and a stopper mechanism constituted by the third magnet 821 of the third magnetic drive circuit 8 and the third seat portions 881 and 882 of the third coil holder 85. Therefore, even when the movable body 3 is excessively moved, the portions where the strength is weak are hard to contact each other, so that the reliability of the actuator 1 is high. Also, the movable range of the movable body 3 in the X direction and the Y direction relative to the support 2 is regulated by a stopper mechanism provided between the first coil holder 65 and the first magnet 622, a stopper mechanism provided between the second coil holder 75 and the second magnet 721, and a stopper mechanism provided between the third coil holder 85 and the third magnet 821. Such stopper mechanisms can be provided at positions overlapping with the first magnetic drive circuit 6, the second magnetic drive circuit 7 and the third magnetic drive circuit 8 in the Z direction. Therefore, it is possible to reduce the area of the actuator 1 when viewed from the Z direction.

(Modification Example of Restraining Member 90)

Figure 10:
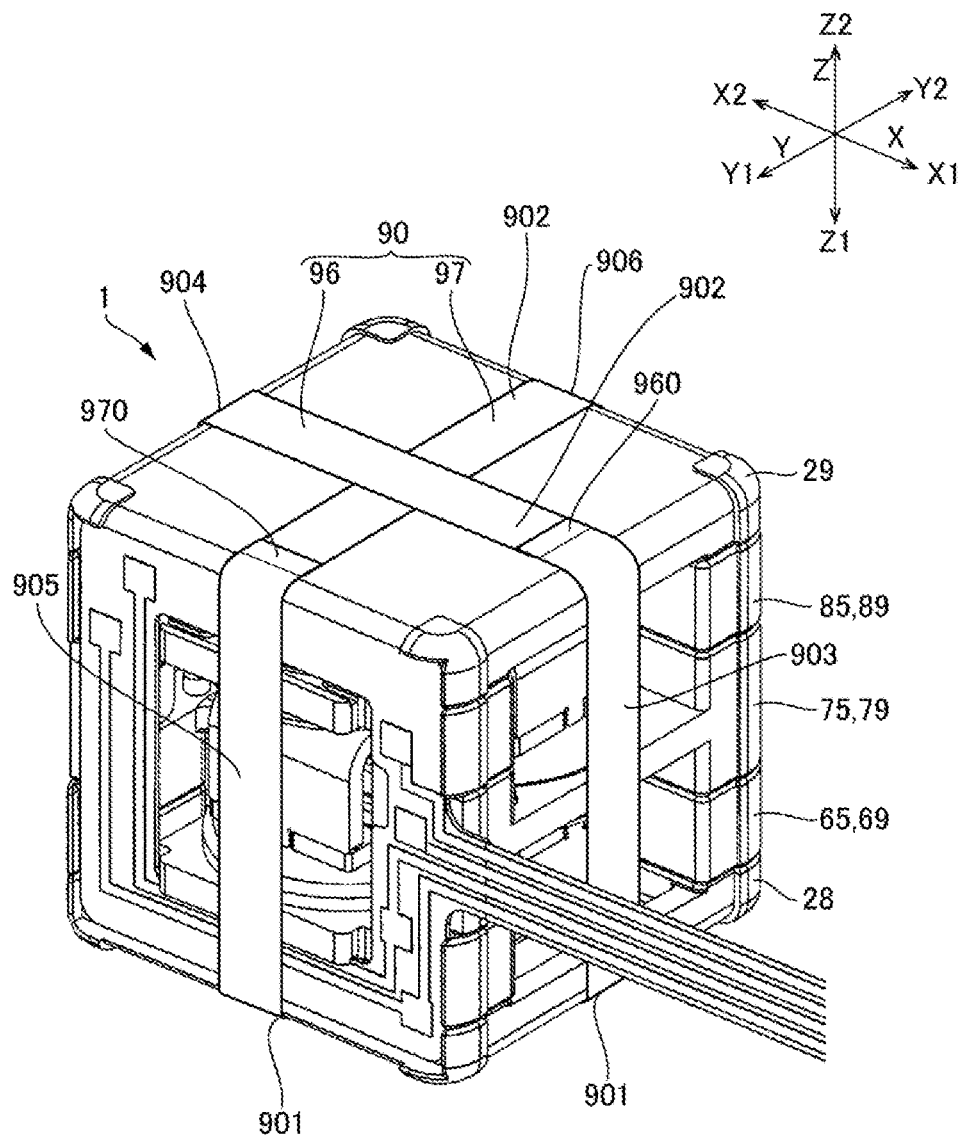
FIG. 10 is an explanatory diagram showing a modification example of a restraining member used for an actuator to which the present invention is applied.

FIG. 10 is an explanatory diagram showing a modification example of the restraining member 90 used in the actuator 1 to which the present invention is applied. In the above embodiment, while the restraining member 90 is formed by the first member 91 and the second member 92 obtained by bending a metal plate member in advance, but in the present embodiment, the restraining member 90 is constituted by the first member 96 and the second member 97 which extend in a strip shape as shown in FIG. 10.

More specifically, the first member 96 is wound so as to return from the other side Z2 in the Z direction of the body portion 10 to the other side Z2 in the Z direction, through the one side X1 in the X direction, the one side Z1 in the Z direction, and the other side X2 in the X direction, and an end 970 is fixed by a method such as welding on the other side Z2 in the Z direction. Further, the second member 97 is wound so as to return from the other side Z2 in the Z direction of the body portion 10 to the other side Z2 in the Z direction, through the one side Y1 in the Y direction, the one side Z1 in the Z direction, and the other side Y2 in the Y direction, and an end 960 is fixed by a method such as welding on the other side Z2 in the Z direction. Therefore, in the restraining member 90 according to the present embodiment, the first member 96 includes the first portion 901 directly overlapping the first coil holder 65 from the one side Z1 in the Z direction, the second portion 902 overlapping the second coil holder 75 through the third coil holder 85 from the other side Z2 in the Z direction, the third portion 903 connected to the first portion 901 and the second portion of the support 2 on the one side X1 in the X direction, and the fourth portion 904 connected to the first portion 901 and the second portion 902 of the support 2 on the other side X2 in the X direction. In addition, in the restraining member 90 of the present embodiment, the second member 97 includes the first portion 901 directly overlapping the first coil holder 65 from the one side Z1 in the Z direction, the second portion 902 overlapping the second coil holder 75 through the third coil holder 85 from the other side Z2 in the Z direction, the fifth portion 905 connected to the first portion 901 and the second portion of the support 2 on the one side Y1 in the Y direction, and the sixth portion 906 connected to the first portion 901 and the second portion 902 of the support 2 on the other side Y2 in the Y direction.

Even in this configuration, the first coil holder 65, the second coil holder 75, and the third coil holder 85 are tightened in the Z direction by the restraining member 90. Therefore, the first coil holder 65, the second coil holder 75, and the third coil holder 85 can be arranged to be overlapped in the Z direction without rattling.

OTHER EMBODIMENTS

In the above embodiment, although one first magnet 622 is used for the first magnetic drive circuit 6 and one third magnet 821 is used for the third magnetic drive circuit 8, the first magnet may be disposed on both sides in the Z direction of the first coil 61 in the first magnetic drive circuit 6, and the third magnet may be disposed on both sides in the Z direction of the third coil 81 in the third magnetic drive circuit 8.

In the above embodiment, the elastic members 4 (viscoelastic members) are disposed on both sides of the movable body 3 in the Z direction. However, the elastic members 4 (viscoelastic members) may be disposed on both sides of the movable body 3 in the X direction and on both sides of the movable body 3 in the Y direction. Further, in the above embodiment, the gel damper member is used as the elastic member 4. However, rubber or a spring may be used as the elastic member 4. As a gel member (gel damper member), a silicone-based gel can be shown as an example. More specifically, as the elastic member 4, a silicone-based gel having a penetration of 10 degrees to 110 degrees can be used. The penetration degree is defined in JIS-K-2207 and JIS-K-2220, and means that the smaller the value, the harder it is.

Further, viscoelasticity is a property of both viscosity and elasticity, and is a characteristic property of a polymer material such as a gel member, a plastic material, and a rubber material. Accordingly, as the elastic member 4 having viscoelasticity, various rubber materials such as natural rubber, diene rubber (for example, styrene-butadiene rubber, isoprene rubber, butadiene rubber, chloroprene rubber, acrylonitrile-butadiene rubber, or the like), non-dime rubber (for example, butyl rubber, ethylene propylene rubber, ethylene propylene diene rubber, urethane rubber, silicone rubber, fluorine rubber, or the like), and thermoplastic elastomer, and a modified material thereof may be used.

Further, in the above embodiment, in connecting both surfaces of the first elastic member 41 in the Z direction with the movable body 3 and the first end plate 28 by adhesion, and connecting both surfaces of the second elastic member 42 in the Z direction with the movable body 3 and the second end plate 29 by adhesion, the elastic member 4 (the first elastic member 41 and the second elastic member 42) is in a state of being compressed in the Z direction between the support 2 and the movable body 3. Therefore, since the elastic member 4 reliably follows the movement of the movable body 3, the resonance of the movable body 3 can be effectively prevented.

In the above embodiment, the coil and the coil holder are provided on the support 2, and the magnet and the yoke are provided on the movable body 3. However, the present invention may be applied to the case where the coil and the coil holder are provided on the movable body 3, and the magnet and the yoke are provided on the support 2. In this case, the holder is constituted by a yoke which holds the magnet.

INDUSTRIAL APPLICABILITY

In the actuator according to the present invention, the plurality of holders (first holder and second holder) for holding the coils or the magnets of the magnetic drive circuits are arranged in a stacked manner in the first direction in the support. Therefore, the plurality of the magnetic drive circuits (the first magnetic drive circuit and the second magnetic drive circuit) are arranged in a superimposed manner in the first direction. Therefore, the size (planar area) of the actuator when viewed from the first direction is small. Further, although the plurality of the holders is arranged to overlap each other in the first direction, the restraining member clamps and restrains the plurality of the holders from both sides in the first direction. Therefore, it is possible to arrange the plurality of holders in the first direction without rattling.

The invention claimed is:

1. An actuator comprising:
   a support comprising a first holder and a second holder which overlaps with the first holder in a first direction;
   a movable body capable of moving with respect to the support;
   a first magnetic drive circuit comprising a first coil and a first magnet, one of the first coil and the first magnet held by the first holder, the other of the first coil and the first magnet held by the movable body, the first magnetic drive circuit driving the movable body in a second direction orthogonal to the first direction;
   a second magnetic drive circuit comprising a second coil and a second magnet, one of the second coil and the second magnet held by the second holder, the other of the second coil and the second magnet held by the movable body, the second magnetic drive circuit driving the movable body in a third direction orthogonal to the first direction and crossing the second direction; and a restraining member which fastens and restrains the first holder and the second holder from two sides in the first direction, wherein the restraining member comprises: a first portion that overlaps with the first holder directly or through another member from one side in the first direction; a second portion that overlaps with the second holder directly or through another member from the other side in the first direction; a third portion connected to the first portion and the second portion on one side of the support in the second direction; a fourth portion connected to the first portion and the second portion on an other side of the support in the second direction; a fifth portion connected to the first portion and the second portion on one side of the support in the third direction; and a sixth portion connected to the first portion and the second portion on an other side of the support in the third direction.

2. The actuator according to claim 1,
wherein the restraining member comprises: a first member in which the third portion and the fourth portion are bent toward the other side in the first direction from an end of the first portion on one side in the second direction and an end of the first portion on the other side in the second direction; and a second member in which the fifth portion and the sixth portion are bent toward one side in the first direction from an end of the second portion on one side in the third direction and an end of the second portion on the other side in the second direction, wherein each of ends of the third portion and the fourth portion on the other side in the first direction is coupled to the second portion, and wherein each of ends of the fifth portion and sixth portion on one side in the first direction is coupled to the first portion.

3. The actuator according to claim 2,
wherein each of the first member and the second member is a metal plate member, wherein each of the ends of the third portion and the fourth portion on the other side in the first direction is coupled to the second portion by welding, and wherein each of the ends of the fifth portion and the sixth portion on one side in the first direction is coupled to the first portion.

4. The actuator according to claim 2, wherein the first member and the second member have a same configuration including size and shape.

5. The actuator according to claim 1,
wherein the first holder comprises a first holding portion which holds the first coil or the first magnet, and a plurality of first columnar portions projecting in the first direction at an end of the first holding portion, wherein the second holder comprises a second holding portion which holds the second coil or the second magnet, and a plurality of second columnar portions projecting in the first direction at an end of the second holding portion, and wherein the plurality of first columnar portions and the plurality of second columnar portions are coupled to each other respectively.

6. The actuator according to claim 5, further comprising:
a third holder provided in the support and arranged to overlap the second holder on an opposite side to the first holder; and
a third magnetic drive circuit in which one of a third coil and a third magnet is held by the third holder and the other of the third coil and the third magnet is held by the movable body to drive the movable body in the second direction, wherein the restraining member clamps and restrains the first holder, the second holder, and the third holder from both sides of the first direction.

7. The actuator according to claim 1,
wherein the first holder is a first coil holder which holds the first coil, and
wherein the second holder is a second coil holder which holds the second coil.

* * * * *